United States Patent
Baldauf et al.

(10) Patent No.: US 9,322,597 B2
(45) Date of Patent: Apr. 26, 2016

(54) CARBON DIOXIDE REDUCTION IN STEELWORKS

(75) Inventors: Manfred Baldauf, Erlangen (DE); Günter Schmid, Hemhofen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 196 days.

(21) Appl. No.: 14/128,104

(22) PCT Filed: Jun. 12, 2012

(86) PCT No.: PCT/EP2012/061078
§ 371 (c)(1),
(2), (4) Date: Dec. 20, 2013

(87) PCT Pub. No.: WO2012/175368
PCT Pub. Date: Dec. 27, 2012

(65) Prior Publication Data
US 2014/0130639 A1   May 15, 2014

(30) Foreign Application Priority Data
Jun. 20, 2011   (DE) .......................... 10 2011 077 819

(51) Int. Cl.
*C01B 31/18*   (2006.01)
*C21B 5/06*   (2006.01)
(Continued)

(52) U.S. Cl.
CPC ................. *F27D 17/00* (2013.01); *B01D 53/62* (2013.01); *C01B 31/18* (2013.01); *C21B 5/06* (2013.01);
(Continued)

(58) Field of Classification Search
CPC .......... C01B 31/18; C21B 5/06; C21B 7/002; C21B 2100/02; C21B 2100/04; C21B 2100/06; B01D 53/62; F27D 17/00
See application file for complete search history.

(56) References Cited

U.S. PATENT DOCUMENTS 8,834,599 B2 * 9/2014 Millner ................... C21B 5/06
266/156
8,992,664 B2 * 3/2015 Didelon ................. C21B 5/001
266/156
(Continued)

FOREIGN PATENT DOCUMENTS

DE   102008031437   1/2010
DE   102011077819.5   6/2011
(Continued)

OTHER PUBLICATIONS

Barbara, F., et al., Derwent Acc No. 2007-675879 for the patent family including WO 2007088166 A1 published Aug. 9, 2007 and US 20070013828 A1. Abstract.*
(Continued)

*Primary Examiner* — George Wyszomierski
*Assistant Examiner* — Tima M McGuthry Banks
(74) *Attorney, Agent, or Firm* — Staas & Halsey LLP

(57) ABSTRACT

A method reduces carbon dioxide resulting from a steel production process. The carbon dioxide is reacted with an electropositive metal in combustion to produce carbon monoxide. The resultant carbon monoxide is fed back into the steel production process. In this method, the carbon monoxide can be used in a direct reduction method as a reduction gas or can be fed to a blast furnace process. The reacted metal can also be recovered by electrochemical conversion from its oxides or salts. In particular, a form of regenerative energy can be used to recycle the electropositive metal.

14 Claims, 2 Drawing Sheets

(51) Int. Cl.
*B01D 53/62* (2006.01)
*C21B 7/00* (2006.01)
*F27D 17/00* (2006.01)

(52) U.S. Cl.
CPC ............ *C21B 7/002* (2013.01); *C21B 2100/02* (2013.01); *C21B 2100/04* (2013.01); *C21B 2100/06* (2013.01); *Y02P 10/122* (2015.11); *Y02P 10/132* (2015.11); *Y02P 10/212* (2015.11); *Y02P 10/265* (2015.11); *Y02P 10/283* (2015.11)

(56) References Cited

U.S. PATENT DOCUMENTS

| | | | |
|---|---|---|---|
| 2009/0013593 | A1 | 1/2009 | Young |
| 2009/0013828 | A1* | 1/2009 | Martinis ............ C21B 13/0073 75/505 |
| 2009/0016948 | A1 | 1/2009 | Young |
| 2010/0064855 | A1 | 3/2010 | Lanyi et al. |
| 2011/0033355 | A1* | 2/2011 | Smith .................... B01D 53/62 423/224 |
| 2011/0113844 | A1 | 5/2011 | Schmid |
| 2013/0178677 | A1* | 7/2013 | Schmid ................. C01B 21/061 585/325 |
| 2013/0196271 | A1 | 8/2013 | Schmid |
| 2013/0260263 | A1 | 10/2013 | Schmid |

FOREIGN PATENT DOCUMENTS

| | | | | |
|---|---|---|---|---|
| DE | 102010041033 | | 3/2012 | |
| EP | 0796349 | | 11/1998 | |
| FR | 2848123 | A1 * | 6/2004 | ......... B01D 53/1475 |
| JP | EP 0418864 | A2 * | 3/1991 | ............. C01B 31/20 |
| JP | 5-68853 | | 3/1993 | |
| WO | 2010/049536 | | 5/2010 | |
| WO | 2012/013485 | | 2/2012 | |
| WO | 2012/017916 | | 2/2012 | |
| WO | 2012/038330 | | 3/2012 | |
| WO | PCT/EP2012/061078 | | 6/2012 | |

OTHER PUBLICATIONS

Arvanitis, E., et al., Derwent Acc No. 2012-D77949 for the patent family including WO 2012038330 A2 published Mar. 29, 2012 and US 20130178677 A1. Abstract.*
Millner, R., et al., Derwent Acc No. 2010-E74229 for the patent family including WO 2010046211 A1 published Apr. 29, 2010 and US 8834599 B2.*
Etienne, F.P., French Patent 2848123 A1 published Jun. 2004. Machine translation of the description.*
Der-Yan Hwang et al., "Reaction mechanism of $CO_2$ with Ca atom: A theoretical study," Chemical Physics Letters 331, 2000, pp. 526-532.
Dr. F. Ausfelder et al., "Discussion paper: Utilization and storage of $CO_2$," http://www.dechema.de/dechema_media/diskussionco2.pdf, Oct. 2008, 36 pages. (with 27 page translation).
German Office Action for German Priority Patent Application No. 10 2011 077 819.5, issued Mar. 1, 2012, 5 pages.
English language International Search Report for PCT/EP2012/061078, mailed Dec. 21, 2012, 4 pages.

* cited by examiner

CARBON DIOXIDE REDUCTION IN STEELWORKS

CROSS REFERENCE TO RELATED APPLICATIONS

This application is based on and hereby claims priority to International Application No. PCT/EP2012/061078 filed on Jun. 12, 2012 and German Application No. 10 2011 077 819.5 filed on Jun. 20, 2011, the contents of which are hereby incorporated by reference.

BACKGROUND

The present invention relates to a method for carbon dioxide reduction during the production of steel and also to a suitable arrangement with a steelworks.

During the production of steel, large amounts of coal and coke are expended. When fossil fuels are combusted, carbon dioxide is formed and up to now has been exported from steelworks into the ambient air in many cases. It is known that these emissions increasingly lead to an environmental and climatic problem.

A known approach for reducing carbon dioxide emission is so-called CCS routes (Carbon Dioxide Capture and Storage) which lead to the sequestration of highly concentrated carbon dioxide. During the sequestration, highly concentrated carbon dioxide is stored in underground chambers. In order to obtain highly concentrated carbon dioxide of a purity of approximately 98% or higher from steelworks off-gases, this is separated therefrom by gas-scrubbing processes.

In this case, the emission is indeed avoided, or at least reduced, but new carbon is still continuously introduced into the blast-furnace process and additional carbon dioxide is constantly produced and reemitted or has to be separated and stored.

SUMMARY

It one potential object to provide a method and a system with which the carbon dioxide emission of a steelworks can be reduced and a carbon dioxide sequestration can be avoided.

The inventors propose a method in which the carbon dioxide emission during the production of steel is reduced. The carbon dioxide which is formed in the steel production process is converted in this method in a combustion step with an electropositive metal. At least a first combustion product is formed in this case and resupplied to the steel production process. This method, therefore, compared with previously known methods for avoiding carbon dioxide emission, such as sequestration, has the advantage that it chemically reconverts the environmentally harmful carbon dioxide, and at least one product, which can be reused in the same process, is formed at the same time.

In an advantageous embodiment, the method for carbon dioxide reduction comprises a combustion step with an electropositive metal, in which an exothermic reaction with the electropositive metal takes place, generating thermal energy which can be used in power plant technology. This thermal energy can therefore be converted into electric energy or it is supplied to the steel production process. This has the advantage that in addition to avoiding carbon dioxide emission, electric energy can be generated, or the consumption of electric energy in the steel production process can be reduced.

For utilizing the thermal energy for generating electric energy, the method can be coupled to a method for generating electric energy. To this end, the steelworks is especially arranged with a power plant. This has the advantage that the thermal energy is not lost.

If the method is combined with a method for generating electric energy in which the thermal energy which is generated in the combustion step and can be used in power plant technology is converted into electric energy, the method has the further advantage of ensuring an almost complete utilization of secondary and waste products of, for example, the electric energy generation.

If the thermal energy, which in particular becomes free in the combustion step with an exothermic reaction of the electropositive metal, is to be supplied to a step for generating electric energy, a heat transport, for example, is carried out. The utilization process, taken separately, already generates energy in the form of high-temperature heat in the combustion step which can be utilized for generating electric energy, for example via a steam turbine. The utilization process is advantageously connected via the heat transport to a process for generating electric energy.

If alternatively the thermal energy is to be supplied to the steel production process, this can be used for air preheating, for example, in the blast furnace process. This process is called blast heating. The so-called blast in the blast furnace process is delivered in counterflow to the stock column into the metallurgical reactor of the blast furnace, which benefits the reaction, i.e. the combustion of the carbon from the coke.

This embodiment therefore has the advantage that in addition to the reutilization of the carbon dioxide additional energy can be generated and used in the same steel production process.

In an advantageous embodiment of the method, the electropositive metal is a metal of the first main group or a metal of the second main group, or a metal with a normal potential which is smaller than 0 V. The electropositive metal is especially lithium. Alternative electropositive metals are sodium, magnesium or zinc. Alternatively, electropositive metals such as potassium, calcium, strontium or barium can also be used. The globally available quantity of lithium is indeed limited, but a shortage only has to be reckoned with in about 40 years from now. The described method is not necessarily intended to completely cover the entire global energy demand for steel production via the alkali metal lithium. The electropositive metal which is used, however, is especially cycled, i.e. after the combustion step the combustion products of the metal are fed back into the metal. That is to say, no consumption of the electropositive metal takes place in effect. The annual production of lithium, for instance, today lies at 20,000 t, without reprocessing of the unexploited lithium taking place to date. The global reserves of lithium carbonate are estimated at 58 million tons, which corresponds to 11 million tons of lithium. The natural resources of sodium and magnesium, for instance, are subject to practically almost no occurrence limitation.

In a further advantageous embodiment, in the method the first combustion product is at least partially fed back into the steel production process. This first combustion product comprises especially carbon monoxide. This is used in the steel production process for reducing iron oxide.

In the combustion step of the electropositive metal with carbon dioxide, these reaction partners react exothermically. In addition to generating thermal energy, the reaction also yields different combustion products. The reaction is especially conducted so that at the end carbon monoxide is formed as a combustion product. During the combustion step of the electropositive metal with the carbon dioxide, oxides and carbonates of the electropositive metal accumulate as waste products. The carbon dioxide can be reduced by electropositive metals, culminating in carbon. The carbon which is formed in the combustion chamber can, however, in accordance with a Boudouard equilibrium, comproportionate with further carbon dioxide into carbon monoxide, so that at the end carbon dioxide is formally reduced to carbon monoxide by the electropositive metal. The forming of carbon monoxide in this combustion step has the advantage that the carbon monoxide plays an important role in the steel production process and can be resupplied to this. That is to say, a cycle of carbon dioxide and carbon monoxide can be created in this way. Therefore, the carbon can be retained in the system and the emission of carbon dioxide can be prevented.

In a further advantageous embodiment of the method, the first combustion product, which especially features carbon monoxide, is supplied to a blast furnace process of the steel production process. There, the carbon monoxide replaces some of the fuel which is used in the blast furnace process. Coal and/or coke are, or is, especially used as fuel. The coal or the coke in the blast furnace process also serves for the mechanical stabilization of the stock column in order to ensure a sufficiently large contact area between the solid iron ore and the reducing gas atmosphere. In this process step, some of the coal or the coke in the blast furnace is now therefore replaced by the recirculated carbon monoxide. Owing to the fact that only some of the coal or the coke is replaced, the mechanical integrity of the process remains risk free. At the same time, however, a good part of the carbon dioxide converted into carbon monoxide can be reused here. The amount of cycled carbon defines the required amount of electropositive metal by which the conversion of carbon dioxide into carbon monoxide first of all takes place. The smaller the amount of carbon which is to be converted, the smaller the required amount of this electropositive metal too.

In an alternative advantageous embodiment of the method, the blast furnace process is replaced by a direct reduction process in the steel production process. In this case, the first combustion product, i.e. especially the carbon monoxide, is used as reducing gas. In particular, the pure carbon monoxide or the carbon monoxide in a mixture with hydrogen is used as reducing gas. That is to say, in this direct reduction process the coal or the coke can be replaced completely by the recycled carbon monoxide. In a direct reduction process, finely ground iron ore, for example, is exposed to a flow of reducing gas in counterflow in a fluidized bed reactor and converted in the process. This method has, for example, the advantage that additional fossil fuels are no longer used, rather these can be replaced completely by the carbon monoxide from the carbon cycle.

The carbon cycle offers the advantage of being able to realize a steelworks which is free of $CO_2$ emission. In addition, the process of carbon dioxide recycling can be connected to the process for electric power generation by a power plant.

If the generated carbon monoxide is not kept totally within the cycle, the carbon monoxide proportion which is not fed back into the steel production process can, for example, be converted into a further usable end product, such as methanol.

In a further advantageous embodiment, a second combustion product, which is electrochemically reconvertible and which is converted in a reconversion process, is formed in the combustion step of the method. For this reconversion process and the electrochemical reaction which is vital for it, energy is required. For this, especially a regenerative energy source can be used. The second combustion product is especially an oxide and/or a salt of the electropositive metal. If the electropositive metal is lithium, $Li_2O$, $Li_2C_2$ and $Li_2CO_3$, for example, it is formed as a combustion product. That is to say, $CO_2$ can especially be separated out as lithium carbonate from a flue gas flow in this way. This oxide or salt of the electropositive metal can be converted again into the metal in the reconversion process. The metal itself is therefore not consumed in the process, rather only the oxidation step is changed. Therefore, the metal can also be seen as an energy store. Since the reconversion, i.e. the electrochemical conversion, is independent of the steel production process in respect of time, regenerative energies, such a photovoltaic energy or wind energy, can be used for this reconversion process. The method therefore has the added advantage, in addition to reducing carbon dioxide emission, of coupling a store for regenerative energies to the steel production process. The use of an electropositive metal as an energy store also has the advantage, for transmission over longer distances, of being superior to previous energy transmissions, e.g. by transmission lines.

In principle, the carbon dioxide could also be reduced by hydrogen instead of with an electropositive metal. The use of hydrogen, however, is effective only when this is also directly converted at the site of generation. Under standard conditions of 25° C. and 1013 mbar, 1 mole of hydrogen occupies a volume of 24.5 L, whereas 2 moles of lithium occupy only a volume of 0.025 L. The formation enthalpies in relation to the mass for lithium oxide and water are comparable:

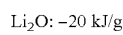

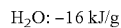

As a result, the metallic lithium has an energy density which is more than 1000 times higher in comparison to the gaseous hydrogen. Hydrogen can be compressed or liquefied, admittedly, but its effective energy density with regard to normal conditions is considerably reduced as a result, however. Moreover, the lithium can be transported much more easily than hydrogen can.

Such a reprocessing of the converted electropositive metal therefore forms a second cycle which, via the combustion reaction, is coupled to the carbon dioxide-carbon monoxide cycle. Such a reprocessing of the electropositive metal can be an electrochemical reduction, for example. In this case, especially oxides, hydroxides or salts of the electropositive metal can be reconverted into the metal. In general, an electrochemical reduction of the metal ions Mn+ can lead back to the metal M. Again, electric energy, which can be produced from regenerative energy, for example, is required for this. Such a reprocessing or reconversion process of the electropositive metal can especially be seen as an energy store for energy which is produced from photovoltaics. Particularly advantageous, therefore, is especially the conducting of a reconversion process for electropositive metals which are subjected to a natural occurrence limitation, such as lithium.

The reconversion process can take place separately from the steelworks process-spatially and temporally.

For the described steelworks process, a steelworks with a combustion chamber, which comprises an electropositive metal, is expediently arranged. In this case, the combustion chamber serves for combusting the electropositive metal. The combustion chamber is preferably designed so that the electropositive metal and carbon dioxide can be introduced into the combustion chamber and so that a combustion step can be carried out therein with an exothermic reaction of the electropositive metal.

The combustion chamber is especially designed so that the reaction can be conducted in such a way that carbon monoxide is formed at the end. In principle, during the exothermic reaction of the electropositive metal with the carbon dioxide, carbon can also be produced. This, however, can additionally comproportionate to carbon monoxide via the Boudouard equilibrium.

The steelworks system proposed by the inventors comprises a combustion chamber, however, which is designed for converting carbon dioxide, which is formed in the steel production process, with an electropositive metal in a combustion step.

In this case, the combustion chamber is designed so that an electropositive metal can be introduced into the combustion chamber and at least a first combustion product can be exported from the combustion chamber and fed back into a device of the steelworks. This has the advantage that not only the environmentally harmful carbon dioxide is processed and chemically reconverted but that at the same time it also directly forms a product which is required for the steel production process and can be made available again to this.

In an advantageous embodiment of this arrangement, the device of steelworks is a blast furnace or alternatively a fluidized bed reactor. The corresponding processes, which were run in the blast furnace or in the fluidized bed reactor, have already been described in the method. In the blast furnace, a so-called stock column is exposed to a flow of hot air in counterflow and only some of the recycled carbon monoxide is added to this method for reducing the iron oxide. In the fluidized bed reactor, a direct reduction process takes place, in which process the synthesis gas includes only the fed-back carbon monoxide from the first combustion product.

In a further advantageous embodiment, the arrangement with the steelworks comprises a recycling device. This recycling device is designed for the electrochemical reconversion of an oxide and/or of a salt of an electropositive metal. This combination with the recycling device has the advantage that the electropositive metal which is converted in the combustion step can be directly recovered. In contrast to carbon dioxide, which cannot be simply split again into carbon and oxygen by electric energy, the situation with the electropositive metal is such that by an electrochemical process the oxide can be reconverted into oxygen and the electropositive metal. It is also the situation with the salts of the electropositive metal.

By way of example, the reactions for lithium oxide are specified in the following.

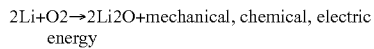
2Li+O2→2Li2O+mechanical, chemical, electric energy

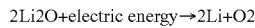
2Li2O+electric energy→2Li+O2

Therefore, lithium serves as an energy carrier and store and can therefore be cycled without being consumed. This aspect is known from printed publication DE 10 2008 031 437 A1, for example.

The recycling device can especially draw the electric energy which is required for the reconversion from a regenerative energy source. This therefore has the advantage that by an energy store, such as lithium, renewable energies can be integrated into the steelworks process. Lithium lies, for instance, sufficiently high up a thermodynamic energy scale in this case so that it can strongly exothermically react not only in air, but also in pure nitrogen, hydrogen and carbon dioxide, which enables conversion of the carbon dioxide.

Furthermore, the energy which is produced as a result of the exothermic reaction can also be used in power plant technology. That is to say, the waste heat temperature is high enough for this to be able to be used for generating electric energy.

Alternatively, the thermal energy remains in the steel production process. For this, the arrangement especially comprises a heat transporting device via which the combustion chamber is connected to the steelworks so that thermal energy, which is produced in the combustion chamber as a result of the combustion step and can be used in power plant technology, can be transported and supplied to the steel production process. The heat can be used in the steel production process, especially in the blast furnace process for blast heating.

BRIEF DESCRIPTION OF THE DRAWINGS

These and other objects and advantages of the present invention will become more apparent and more readily appreciated from the following description of the preferred embodiments, taken in conjunction with the accompanying drawing of which.

DETAILED DESCRIPTION OF THE PREFERRED EMBODIMENT

Figure 1:
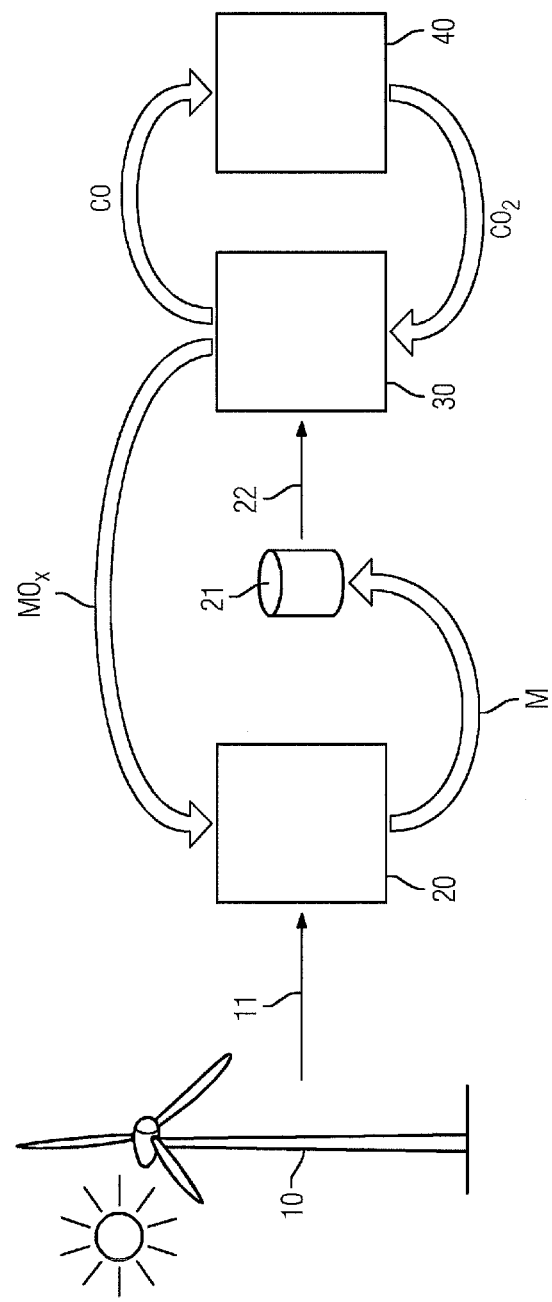
FIG. 1 schematically shows the arrangement of a steelworks 30, 40 with a recycling device 20 for reconversion of the electropositive metal M with a plant for producing electric energy 10 from the wind and/or sun.

Reference will now be made in detail to the preferred embodiments of the present invention, examples of which are illustrated in the accompanying drawing, wherein like reference numerals refer to like elements throughout.

FIG. 1 schematically shows the arrangement of a steelworks 30, 40 with a recycling device 20 for reconversion of the electropositive metal M with a plant for producing electric energy 10 from the wind and/or sun. On the left-hand side of the drawing, a wind-powered turbine wheel and the sun are symbolically depicted for the regenerative energy source 10. From this regenerative energy source 10, electric current 11 is transported to the recycling device 20. In the recycling device 20, the reduction of an electropositive metal M from an oxide or a salt MO$_x$ takes place. This reduction process is especially carried out electrochemically. The energy which is required for this is drawn from the regenerative energy source 10. Leading away from the recycling device 20 is an arrow which represents a product of the recycling device 20, specifically the electropositive metal M. Leading towards the recycling device 20 is an arrow which represents the introduction of a salt or oxide MOx of the electropositive metal M which is to be converted. The electropositive metal M serves as an energy store 21, so-to-speak. This is represented symbolically by a cylindrical tank 21, into which an arrow leads. Leading away from this cylindrical tank 21 as an energy store is an arrow 22 which illustrates the transporting path to the steelworks 30, 40. The electropositive metal M in its function as an energy store 21 can admittedly also be formed in a recycling device 20 directly at the steelworks 30, 40, but transporting 22 of the metal M is also conceivable since this is significantly more effective and more loss-free to realize than the transporting of comparable energy stores such as hydrogen, or in comparison to electric current transporting via transmission lines.

A combustion chamber 30 and also a further device of the steelworks 40 are then schematically shown, in which the following processes take place:

In the combustion chamber 30, the carbon dioxide conversion with the electropositive metal M takes place. By an arrow which leads into the combustion chamber 30 and leads away from the combustion chamber 30, it is shown that the carbon dioxide $CO_2$ can be introduced into the combustion chamber 30 and carbon monoxide CO leaves the combustion chamber 30. Also, the arrow with the oxide or salt of the electropositive metal $MO_x$, which leads into the recycling device 20, leads away from this combustion chamber 30.

Shown in addition to the combustion chamber 30 is the device 40 of the steelworks into which the carbon monoxide CO is fed again and from which the carbon dioxide $CO_2$ is separated out. The process in which the carbon monoxide CO reacts to form carbon dioxide $CO_2$ therefore takes place in this device. This occurs when reducing iron oxides, as is undertaken in the processing of iron ores for steel production. The device 40 can represent the blast furnace of the steelworks, in which some of the carbon monoxide CO is reused together with further fossil fuels. The device 40, however, can also represent a fluidized bed reactor in which a direct reduction process uses up the entire carbon monoxide CO as reducing gas. According to this, no new carbon is introduced into the system but the carbon is fully cycled between these two devices of the combustion chamber 30 and the fluidized bed reactor 40. FIG. 1 illustrates that in addition to the carbon cycle, an additional cycle, specifically the cycle of the electropositive metal M, can be coupled to the steelworks process.

The combustion in the combustion chamber 30 is especially to be conducted so that the end product is carbon monoxide:

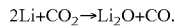

$$2Li + CO_2 \rightarrow Li_2O + CO.$$

The resulting carbon monoxide CO can be used in the blast furnace 40 of the steelworks directly for reducing the iron oxide. In this case, it is reconverted into carbon dioxide $CO_2$.

This is resupplied to the combustion chamber 30 where it can react with an electropositive metal M, especially lithium. As a result, the carbon is therefore cycled. This consequently circulating part of the carbon no longer leaves the steelworks 30, 40 and leads to reduced $CO_2$ emissions.

A further advantage of the carbon dioxide conversion with the electropositive metal lies in the fact that during the combustion step in the combustion chamber 30 energy in the form of high-temperature heat is generated and can be used for generating electric energy. The combustion chamber 30 is therefore preferably coupled to a power plant. In this case, the energy, in the form of high-temperature heat, which is generated in the combustion step in the combustion chamber 30 can additionally be supplied to the power plant, especially to the steam generator in the power plant, and can serve for generating electric energy.

Especially if the present aims for generating regenerative electric energy continue to be successful in this way, sufficient energy can be provided from these sources in the near future to economically and ecologically realize the described cycle. Since this electric energy is generated at a point in time at which it cannot be consumed or completely consumed, it is important that this can be temporarily or even seasonally intermediately stored. The described recycling of an electropositive metal M, especially lithium, fulfills this criteria on such a completely reusable energy carrier 21.

The blast furnace of a steelworks 40 emits about 1.3 million tons of carbon dioxide per year, with a production capacity of 4 million tons per year of steel. For the rereduction of 10% of this carbon dioxide $CO_2$ to carbon monoxide CO would require 42,000 tons of lithium per year. The lithium in this case is not consumed in one pass but is kept in a cycle in which it is regenerated again. Depending upon the cycle duration, only a fraction of the aforementioned lithium quantity would therefore be generally required. If, for example, the lithium were to carry out the cycle 10x/year, only 4200 tons of lithium would be consumed in the cycle for a reduction of 10% of the carbon dioxide output.

Figure 2:
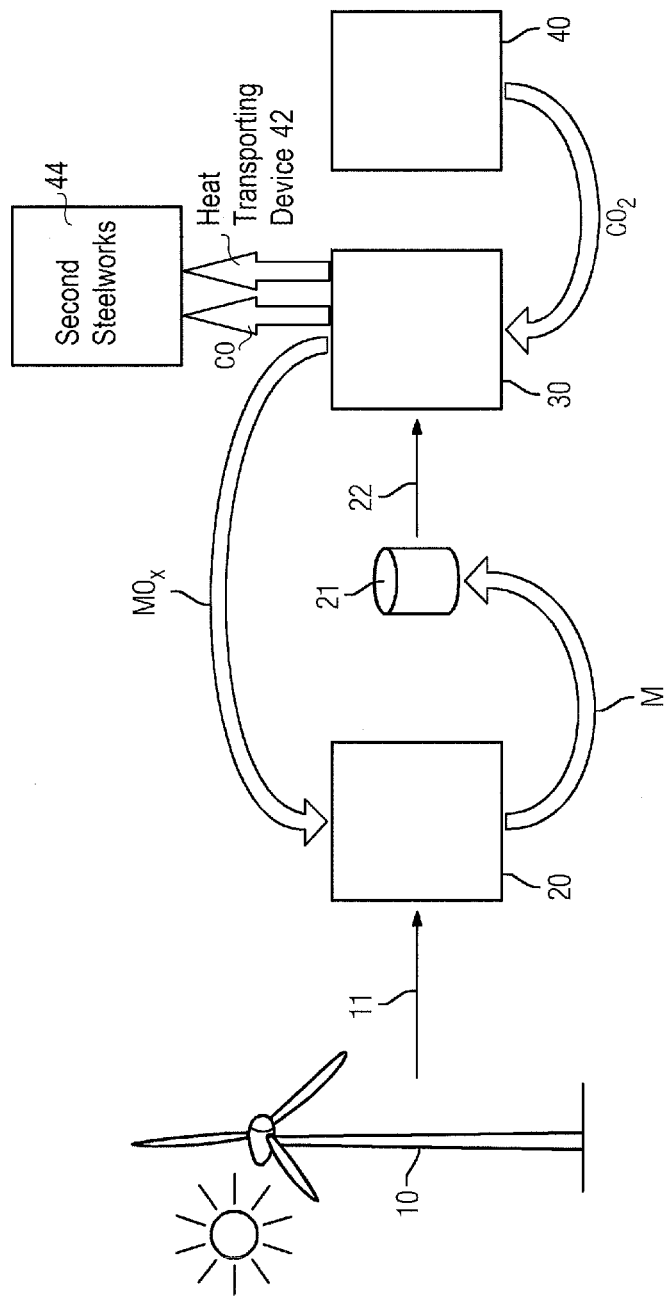
FIG. 2 schematically shows the arrangement of a steelworks 30, 40 with a recycling device 20 for reconversion of the electropositive metal M with a plant for producing electric energy 10 from the wind and/or sun.

Alternatively, as shown in FIG. 2, the thermal energy remains in the steel production process. For this, the arrangement especially comprises a heat transporting device 42 via which the combustion chamber is connected to a second steelworks 44 so that thermal energy, which is produced in the combustion chamber as a result of the combustion step and can be used in power plant technology, can be transported and supplied to the steel production process. The heat can be used in the steel production process, especially in the blast furnace process for blast heating.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for reducing carbon dioxide, comprising:
   receiving carbon dioxide which is formed in a steel production process;
   combusting the carbon dioxide with an electropositive metal to convert the carbon dioxide and produce a first combustion product and thermal energy; and
   feeding the first combustion product and the thermal energy back into the steel production process.

2. The method as claimed in claim 1, wherein the electropositive metal is a metal selected from the group consisting of metals the first main group of the periodic table, metals of the second main group of the periodic table and metals with a normal potential which is less than zero volts.

3. The method as claimed in claim 1, wherein the electropositive metal is lithium.

4. The method as claimed in claim 1, wherein
   the first combustion product comprises carbon monoxide, and
   the carbon monoxide is fed back into the steel production process and used for reducing iron oxide.

5. The method as claimed in claim 4, wherein the first combustion product is supplied to a blast furnace of the steel production process and used to replace a portion of a fuel used in the blast furnace.

6. The method as claimed in claim 5, wherein the fuel is at least one of coal and coke.

7. The method as claimed in claim 4, wherein
   the first combustion product is supplied to a direct reduction process in the steel production process, and
   in the direct reduction process the first combustion product functions as reducing gas.

8. The method as claimed in claim 7, wherein
   a carbon monoxide-hydrogen gas mixture is used as the reducing gas.

9. The method as claimed in claim 1, wherein
   combusting the carbon dioxide with the electropositive metal also produces a second combustion product, and
   the second combustion product is supplied to a reconversion process in which regenerative energy is used to electrochemically reconvert the second combustion product.

10. The method as claimed in claim 9, wherein
the second combustion product comprises an oxide and/or a salt of the electropositive metal, and
the second combustion product is converted into the electropositive metal in the reconversion process.

11. A steelworks system, comprising:
a combustion chamber to receive carbon dioxide from a first steelworks device and to combust the carbon dioxide with an electropositive metal to produce a first combustion product and thermal energy;
a second steelworks device to receive the first combustion product from the combustion chamber; and
a heat transporting device to connect the combustion chamber with the second steelworks device to transport the thermal energy from the combustion chamber to the second steelworks device.

12. The system as claimed in claim 11, wherein the second steelworks device is a blast furnace or a fluidized bed reactor.

13. The system as claimed in claim 11, wherein
combusting the carbon dioxide with the electropositive metal produces the first combustion product and an oxide and/or of a salt of the electropositive metal, and
the system further comprises a recycling device to electrochemically reconvert the oxide and/or the salt of the electropositive metal into the electropositive metal.

14. The system as claimed in claim 13, wherein
the recycling device uses energy from a regenerative energy source to electrochemically reconvert the oxide and/or the salt of the electropositive metal.

\* \* \* \* \*